(12) United States Patent
Reed et al.

(10) Patent No.: US 7,377,236 B2
(45) Date of Patent: *May 27, 2008

(54) SYSTEM AND METHOD FOR EXHAUST HEAT GENERATION USING ELECTRICALLY ACTUATED CYLINDER VALVES AND VARIABLE STROKE COMBUSTION CYCLES

(75) Inventors: Dennis Reed, Dexter, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 18 days.

This patent is subject to a terminal disclaimer.

(21) Appl. No.: 11/223,276

(22) Filed: Sep. 9, 2005

(65) Prior Publication Data

US 2007/0056533 A1    Mar. 15, 2007

(51) Int. Cl.
*F02B 69/06* (2006.01)
*F02P 5/00* (2006.01)

(52) U.S. Cl. .................. 123/21; 123/406.45
(58) Field of Classification Search .......... 123/21, 123/90.15, 339.11, 406.45, 406.29, 406.35, 123/198 F See application file for complete search history.

(56) References Cited

U.S. PATENT DOCUMENTS

| 5,211,011 A | 5/1993 | Nishikawa et al. |
| 5,626,117 A * | 5/1997 | Wright et al. ........... 123/406.55 |
| 6,523,504 B2 * | 2/2003 | Miura .......................... 123/21 |
| 6,725,830 B2 | 4/2004 | Surnilla |
| 7,128,052 B1 * | 10/2006 | Reed et al. ............. 123/406.45 |
| 2003/0121500 A1 | 7/2003 | Shimizu |
| 2003/0209228 A1 | 11/2003 | Miura |
| 2005/0197761 A1 | 9/2005 | Bidner |

* cited by examiner

*Primary Examiner*—Stephen K. Cronin
*Assistant Examiner*—Hyder Ali
(74) *Attorney, Agent, or Firm*—Donald Lewis; Alleman Hall McCoy Russell & Tuttle LLP

(57) ABSTRACT

A method for operating an engine having at least a first and second cylinder, including operating the first cylinder with a spark timing more retarded than a spark timing of a second cylinder; and operating one of said first cylinder and second cylinders with a first number of strokes per cycle different from other cylinders of the engine for at least one combustion cycle.

18 Claims, 10 Drawing Sheets

SYSTEM AND METHOD FOR EXHAUST HEAT GENERATION USING ELECTRICALLY ACTUATED CYLINDER VALVES AND VARIABLE STROKE COMBUSTION CYCLES

FIELD

The present description relates to a method for controlling engine cylinder valve operation.

BACKGROUND AND SUMMARY

Vehicles with internal combustion engines use catalytic converters to convert exhaust constituents and reduce regulated emissions. However, in some converters, conversion efficiency can be low at ambient temperatures. As such, various approaches have been used to increase exhaust heat during engine starting to thereby obtain earlier increased conversion efficiency.

One such approach is described in U.S. Pat. No. 6,725,830, which uses different ignition timing in different cylinder groups to increase total exhaust heat to the catalyst/exhaust, while still providing accurate idle speed control, among other features. In one example, the ignition timing of one group is significantly retarded after top dead center so that little torque is produces, but large quantities of heat are produced. Then, the remaining cylinders operate at higher load, which also increases exhaust heat, while retaining accurate torque control.

However, the inventors herein have recognized that under some conditions, depending on the engine firing order exhaust mixing and heat generation may be somewhat degraded. For example, depending on engine configuration, the firing order may pair some cylinders with the same ignition timing and others with disparate timings. While such operation may be used to reduce vibration under some conditions, there are other conditions where such operation may result in less even exhaust heating and less quantity of exhaust heat transferred to the emission control system devices.

As such, in one aspect, a method for operating an engine having at least a first and second cylinder, comprising: operating the first cylinder with a spark timing more retarded than a spark timing of a second cylinder; and operating one of said first cylinder and second cylinders with a first number of strokes per cycle different from other cylinders of the engine for at least one combustion cycle.

In this way, it is possible to change a combustion firing order to enable improved exhaust gas heating with cylinders having disparate ignition timing, at least under some conditions. In one example, at least one cylinder can be operated with a different number of strokes to vary the combustion firing order until a desired firing order is reached. In another example, multiple cylinders can be operated with varying numbers of strokes to achieve a new firing order. In still other example, cylinders can have the number of strokes of their combustion cycle sequentially varied until a desired firing order is reached.

Another advantage of the above operation is that in some cases, a cylinder can operate with a decreased number of strokes per combustion cycle, thereby further increasing heat flux to the exhaust. For example, cylinders with more ignition timing retard can be operated with a two-stroke combustion cycle, thereby about doubling the amount of heat flux to the exhaust from those cylinders and thus obtain faster catalyst temperature increases.

DETAILED DESCRIPTION

Figure 1:
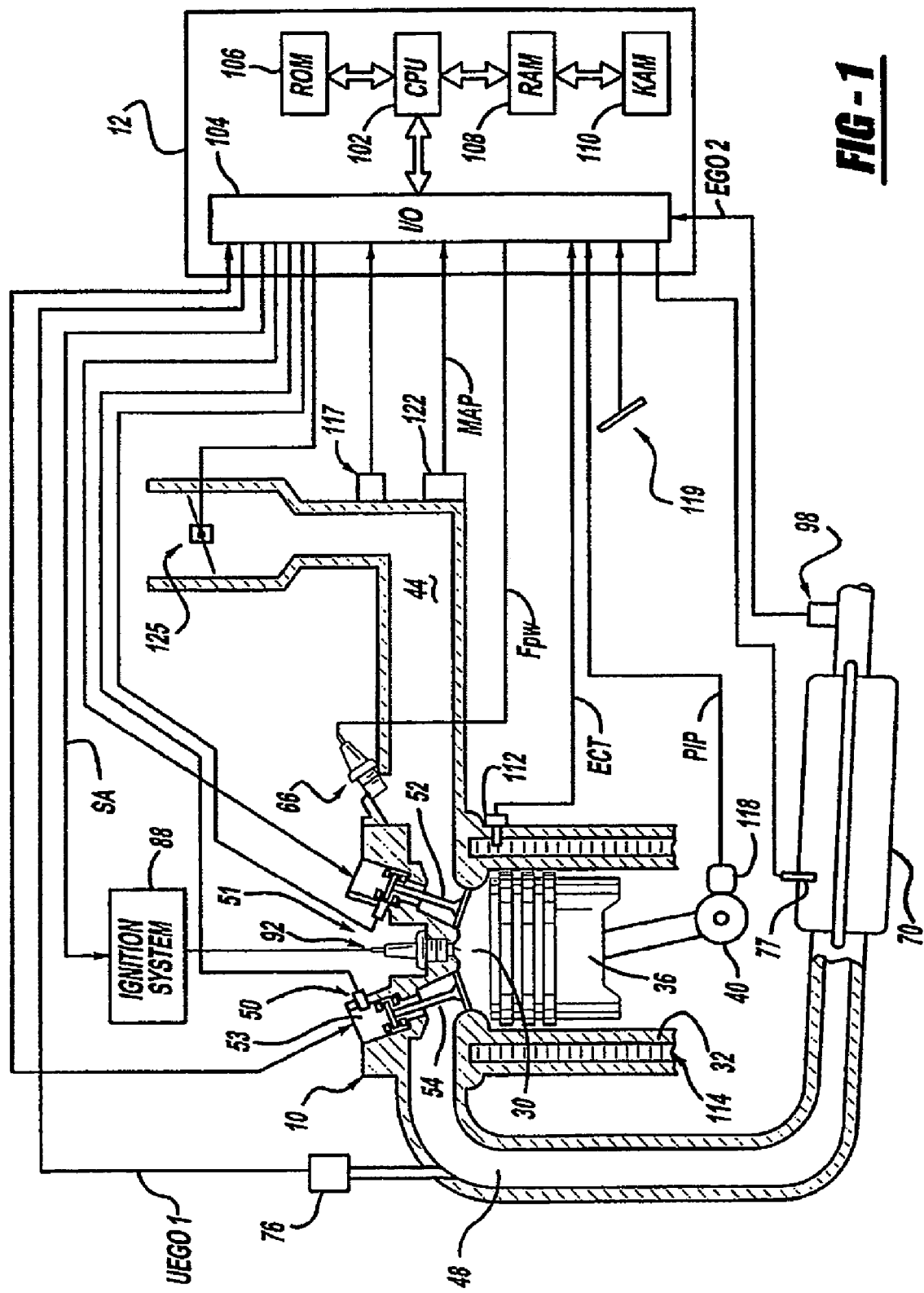
FIG. 1 is a schematic diagram of an engine.
Figure 2:
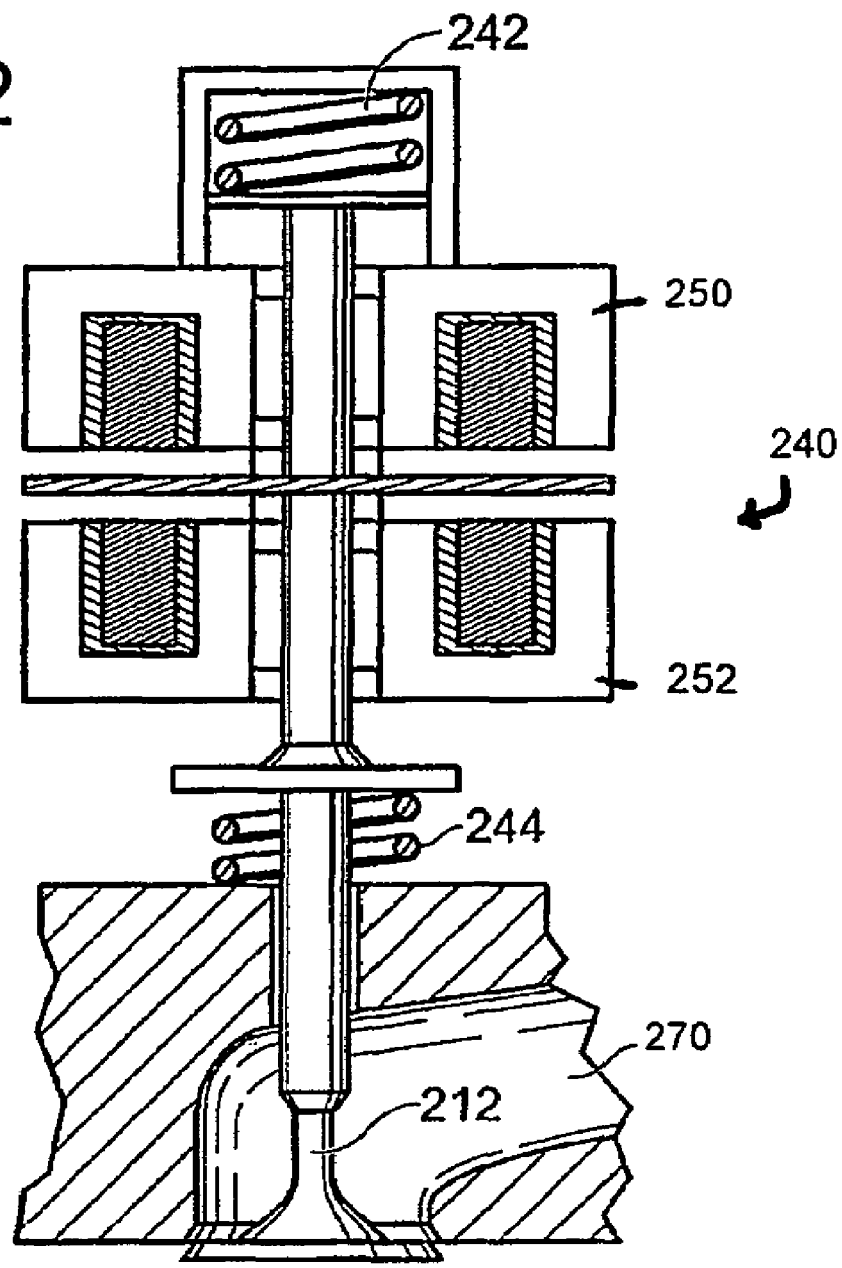
FIG. 2 is a schematic diagram of an engine valve.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 an exhaust valve 54. Each intake and exhaust valve is operated by an electromechanically controlled valve coil and armature assembly 53, such as shown in FIG. 2. Armature temperature is determined by temperature sensor 51. Valve position is determined by position sensor 50. In an alternative example, each of valves actuators for valves 52 and 54 has a position sensor and a temperature sensor. In still another alternative, one or more of intake valve 52 and/or exhaust valve 54 may be cam actuated, and be capable of mechanical deactivation. For example, lifters may include deactivation mechanism for push-rod type cam actuated valves. Alternatively, deactivators in an overhead cam may be used, such as by switching to a zero-lift cam profile.

Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection. In addition, intake manifold 44 is shown communicating with optional electronic throttle 125.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust manifold 48 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, and read-only memory 106, random access memory 108, 110 keep alive memory, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined.

In an alternative embodiment, a direct injection type engine can be used where injector 66 is positioned in combustion chamber 30, either in the cylinder head similar to spark plug 92, or on the side of the combustion chamber. Also, the engine may be coupled to an electric motor/battery system in a hybrid vehicle. The hybrid vehicle may have a parallel configuration, series configuration, or variation or combinations thereof.

FIG. 2 shows an example dual coil oscillating mass actuator 240 with an engine valve actuated by a pair of opposing electromagnets (solenoids) 250, 252, which are designed to overcome the force of a pair of opposing valve springs 242 and 244. FIG. 2 also shows port 270, which can be an intake or exhaust port). Applying a variable voltage to the electromagnet's coil induces current to flow, which controls the force produced by each electromagnet. Due to the design illustrated, each electromagnet that makes up an actuator can only produce force in one direction, independent of the polarity of the current in its coil. High performance control and efficient generation of the required variable voltage can therefore be achieved by using a switch-mode power electronic converter. Alternatively, electromagnets with permanent magnets may be used that can be attracted or repelled.

As illustrated above, the electromechanically actuated valves in the engine remain in the half open position when the actuators are de-energized. Therefore, prior to engine combustion operation, each valve goes through an initialization cycle. During the initialization period, the actuators are pulsed with current, in a prescribed manner, in order to establish the valves in the fully closed or fully open position. Following this initialization, the valves are sequentially actuated according to the desired valve timing (and firing order) by the pair of electromagnets, one for pulling the valve open (lower) and the other for pulling the valve closed (upper).

The magnetic properties of each electromagnet are such that only a single electromagnet (upper or lower) need be energized at any time. Since the upper electromagnets hold the valves closed for the majority of each engine cycle, they are operated for a much higher percentage of time than that of the lower electromagnets.

While FIG. 2 appears show the valves to be permanently attached to the actuators, in practice there can be a gap to accommodate lash and valve thermal expansion.

Figure 3:
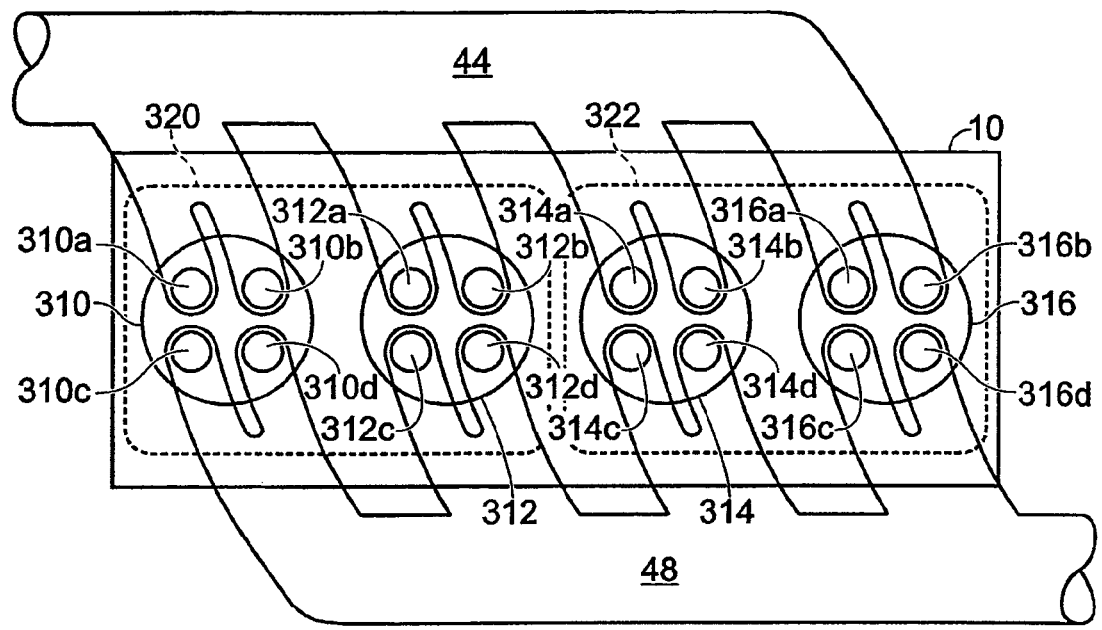
FIGS. 3-4 are example engine and valve configurations.

Referring now to FIG. 3, engine 10 is shown as an example inline four-cylinder engine having each cylinder coupled to a common intake manifold 44 and a common exhaust manifold 48. While this example shows each cylinder coupled to common intake and exhaust manifolds, separate exhaust manifolds for one cylinder, or groups of cylinders, may be used, if desired. One such example is described below herein with regard to FIG. 4.

Continuing with FIG. 3, four cylinders 310, 312, 314, and 316 are shown in an inline configuration. As described below, various other engine configurations and numbers of cylinders may be used, if desired. Each of cylinders 310-316 have four valves per cylinder, labeled a, b, c, and d. Thus, in this example, cylinder 310 has four valves, 310a, 310b, 310c, and 310d. Likewise, cylinder 312 has four valves, 312a, 312b, 312c, and 312d, cylinder 314 has four valves, 314a, 314b, 314c, and 314d, and cylinder 316 has four valves, 316a, 316b, 316c, and 316d. While this example has four valves per cylinder, various other configurations may be used, such as, for example, three valves per cylinder, two valves per cylinder, or combinations thereof.

As shown by FIG. 3, valves with subscript "a" are each in a common location in the cylinder. Likewise, valves with subscript "b" are each in a common location, and so on with subscripts "c" and "d."

In the example of FIG. 3, each cylinder valve may be electrically actuated without the use of a camshaft. Alternatively, some of the cylinder valves may be electrically actuated and some may be cam actuated. The cam actuated valves may have fixed cam timing, or may have variable cam timing. Further, the cam actuated valves may be mechanically deactivated, such as by deactivating a lifter or pushrod, for example.

FIG. 3 shows that each cylinder has two valves coupled to an intake side of the engine (a, b) and two valves coupled to an exhaust side of the engine (c, d). As noted above, different numbers of valves may be used, for example two intake side valves and a single exhaust side valve. Further, as noted above, some valves, such as intake side valves, can be electrically actuated, while some valves, such as exhaust side valves, may be cam actuated.

Continuing with the engine of FIG. 3, the cylinders may be grouped together into groups 320 and 322, where group 320 includes cylinders 310 and 312, and group 322 includes cylinders 314 and 316. This is just one example grouping, and the cylinders may be grouped in other ways, if desired. For example, cylinders 312 and 314 may be one group, and cylinders 310 and 316 another group. As described below herein, the cylinder groups may be operated in selected configurations to provide improved engine exhaust heat and improved performance.

Figure 4:
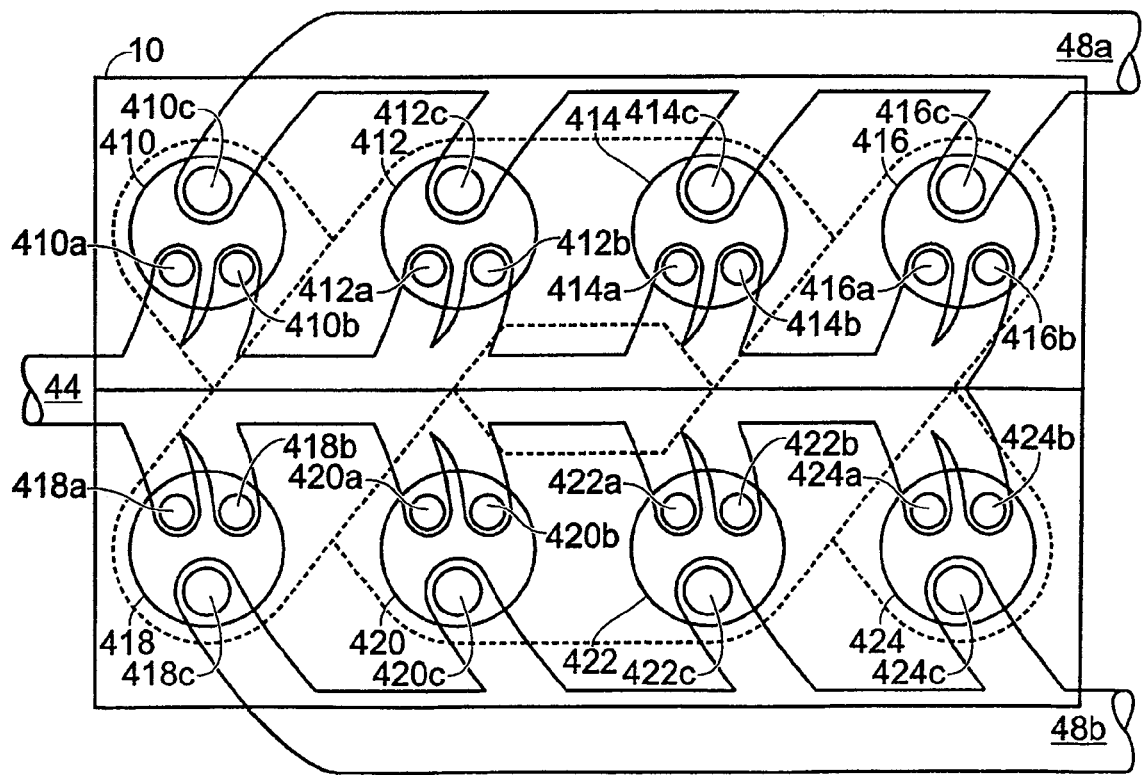

Referring now to FIG. 4, an example V-8 engine is shown having eight cylinders 410, 412, 414, 416, 418, 420, 422, and 424. In this example, cylinders 410-416 are in a first bank, and cylinders 418-424 are in a second bank. While the banks of the engine may constitute cylinder groups, in another example, the cylinders are grouped based on firing order considerations. For example, as shown in FIG. 4, cylinders 410, 420, 422, and 416 constitute group 430, and cylinders 418, 412, 414, and 424 constitute group 432. Note also that more than two groups of cylinders may be used, if desired, and cylinder groups do not necessary have the same number of cylinders, although they may in one example.

FIG. 4 shows that each cylinder has three cylinder valves (a, b, and c). Thus, in this example, cylinder 410 has three valves, 410a, 410b, and 410c. Likewise, cylinder 412 has three valves, 412a, 412b, and 412c, etc., up through cylinder 424 which has valves, 424a, 424b, and 424c. While this example has three valves per cylinder, various other configurations may be used, such as, for example, four valves per cylinder, two valves per cylinder, or combinations thereof.

In the example of FIG. 4, each cylinder valve may be electrically actuated without a camshaft. Alternatively, some of the cylinder valves may be electrically actuated and some may be cam actuated. The cam actuated valves may have fixed cam timing, or may have variable cam timing. Further, the cam actuated valves may be mechanically deactivated, such as by deactivating a lifter or pushrod, for example.

FIG. 4 shows that each cylinder has two valves coupled to an intake side of the engine (a, b) and one valve coupled to an exhaust side of the engine (c). As noted above, different numbers of valves may be used, for example two intake side valves and two exhaust side valves. Further, as noted above, some valves, such as intake side valves, can be electrically actuated, while some valves, such as exhaust side valves, may be cam actuated. Also, FIG. 4 shows a split exhaust manifold (48a and 48b), however a common exhaust manifold may be used, if desired. Further, the split exhaust manifolds may form separate exhaust paths to atmosphere, or be joined together in a Y-pipe configuration. The joining may be upstream and/or downstream of emission control devices.

As will be described in more detail below, the cylinders may be grouped in various ways and numbers, and then the cylinders in one group operated in common and cylinders in another group also operated in common, yet differently than those in the first group. For example, cylinders in group 320 can be operated with significantly retarded spark timing (e.g., more than 5, 10, 15, 20, 25, 30, or more degrees later) than cylinders in group 322. Further, cylinders in group 320 can each be operated with a different number or pattern of valves operating (or deactivated, such as held closed during one or more (or all) strokes of a combustion cycle) than group 322. For example, cylinders in group 320 can operate with valves a and d (with valves b,c deactivated), while cylinders in group 322 can operate with valves b and c (with valves a,d deactivated), thereby providing a different pattern of active/de-active valves. As another example, cylinders in group 320 can operate with valves a, b and d (with valves c deactivated), while cylinders in group 322 can operate with valves b and c (with valves a,d deactivated), thereby providing a different pattern and a different number of active/de-active valves.

In another embodiment, different patterns and/or number of valves between the groups can be used under different conditions. For example, under a first set of conditions, cylinders in group 320 can operate with valves a and c active (b,d deactivated) while cylinders in group 322 operate with valves a, b, and d (c deactivated); and under a second set of conditions, cylinders in group 322 can operate with valves a and c active (b,d deactivated) while cylinders in group 320 operate with valves a, b, and d (c deactivated).

Such variable operation can be used to generate different amounts of airflow and/or charge motion between different cylinders, thereby improving conditions for the particular conditions of the different cylinders. For example, cylinders operated with more retarded ignition timing may be operated with increased charge motion than other cylinders operating with less retarded (or advanced) ignition timing. Also, while the above variations have been described with regard to FIG. 3, they may also be applied to the structure of FIG. 4. Further, various other modifications and variations are possible, such as unequal cylinder groups (or a group of a single cylinder), and various alternative numbers and/or patterns of valves. Further, cylinders within a group are not necessarily operated with the same number and/or pattern of valves. For example, cylinders within a group can operated with different active/deactivated valves, and may vary such operation with operating conditions.

As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the disclosure, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 12.

Figure 5:
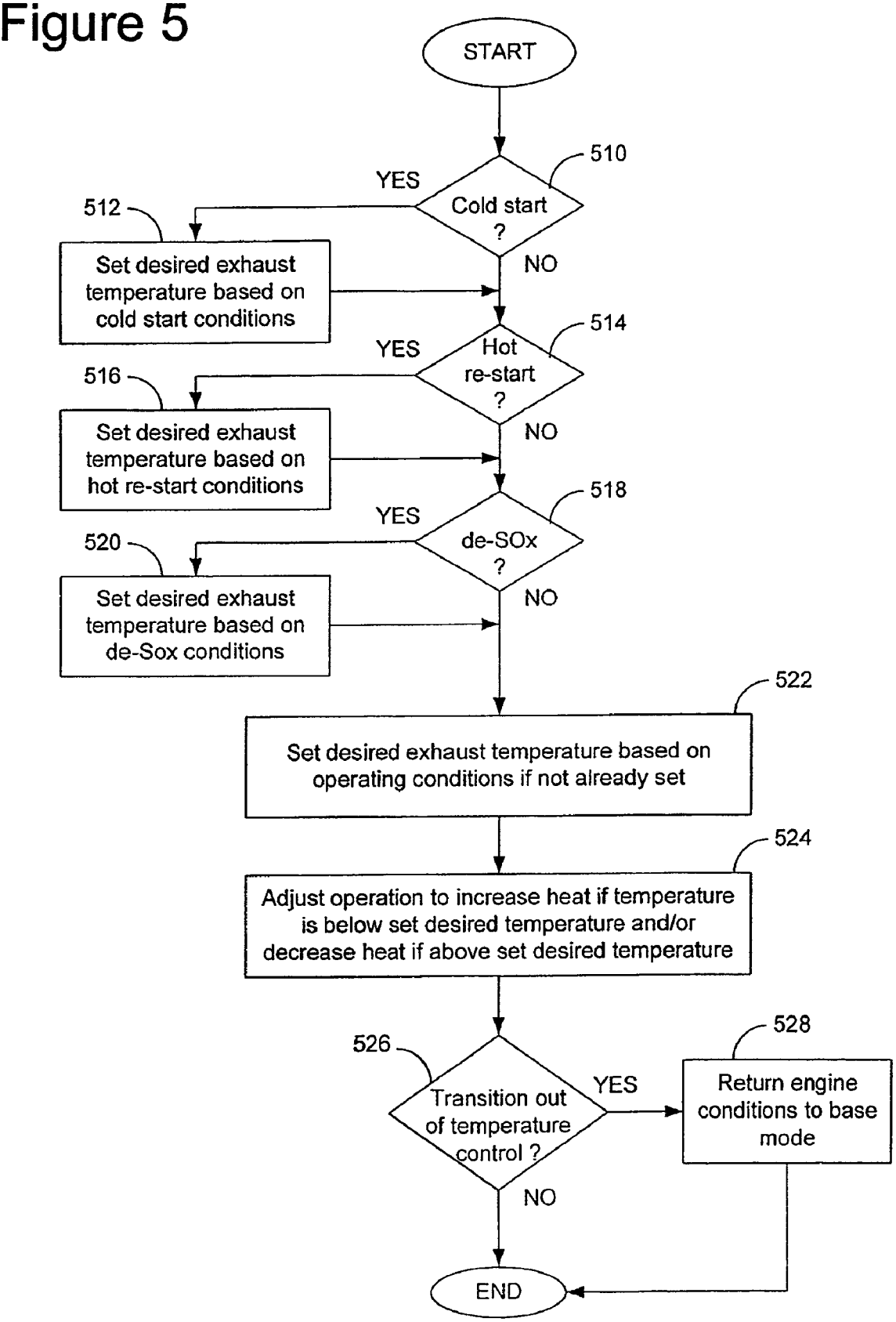
FIGS. 5-7 are high level flow charts illustrating various aspects of control routines.

Referring now to FIG. 5, a routine is described for controlling engine starting operation. Specifically, in step 510, the routine determines whether a cold start conditions is present. Such a condition may be based one or more factors, such as whether engine coolant temperature (ECT) is below a threshold value, whether the engine has been soaking for greater than a pre-selected time, whether catalyst temperature is below a threshold value, and/or combinations thereof or others. If so, the routine continues to step 512 to set a desired exhaust temperature base on cold starting conditions, such as those noted above. In one example, the routine may set a fixed desired exhaust temperature, while in another example the routine may set a desired exhaust and/or catalyst temperature profile that varies with time or duration after a start.

Next, the routine continues to step 514 to determine whether a hot re-start condition may be present. Hot re-starts can be identified based on similar parameters as a cold start, such as ECT and/or soak time. If the answer to step 514 is yes, the routine continues to step 516 to set the desired exhaust and/or catalyst temperature(s) based on the hot re-start conditions. As noted above, a variable profile may also be used, if desired.

In step 518, the routine determines whether a desulphurization is requested and/or in progress. A desulphurization event includes operating one or more emission control devices at an elevated temperature and with a selected air-fuel ratio (e.g., rich, lean, and/or oscillating lean and rich) to reduce contamination, such as sulphur (e.g. SOx) and/or other contaminants. Such a condition may be requested by the routine based on an evaluation of emission control device performance, and/or based on a fixed number or time of engine and/or vehicle operation. If the answer to step 518 is yes, the routine continues to step 520 where the routine sets the desired exhaust and/or catalyst temperature(s) based on the de-SOx conditions. As noted above, a variable temperature profile may also be used, if desired.

Continuing with FIG. 5, in step 522 the routine sets the desired temperature based on operating conditions if not already set above. Note that while a desired temperature, or temperature range may be set and used for exhaust and/or catalyst temperature control, it is also possible to set maximum and minimum temperature limits, above which (or below which) control is activated. However, within the limits, passive temperature operation may be used. Further, only a minimum temperature may be set, and over-temperature (to some extent) tolerated depending on operating conditions.

From step 522, the routine continues to step 524 to adjust engine and/or vehicle operation to increase heat if temperature is below the desired temperature and/or decrease heat if above the desired temperature. As described herein, various adjustments and/or mode variations may be used to adjust the quantity and flux of heat in the exhaust gasses. For example, ignition timing retard of each cylinder in the engine may be used under some conditions, such as when the difference between the desired and actual temperatures is within a pre-selected range. Further, variation in engine valve timing utilized to vary the amount of internal residuals may also be used to affect exhaust temperature, along with the amount of engine flow, air-fuel ratio, idle speed set-point (when in idle speed control), and others. However, other adjustments may also be used in place of, or in addition to, the above. For example, the engine may be operated with split ignition timing as described in more detail below herein with regard to FIG. 6. As another example, the engine can have one or more cylinders vary the quantity of strokes in a combustion cycle, such as operate in two-cycle mode in order to double heat flux to the exhaust. As yet another example, the engine can vary the combustion sequence (firing order) to preferentially provide selected exhaust in a selective manner to further increase heat generation and/or exhaust mixing. Additional details of this and other adjustments are included herein below.

From step 524, the routine continues to step 526 where the routine determines whether conditions are present to transition out of temperature control. For example, if a driver tips-in, the engine may discontinue or reduce various modes of operation, such as ignition timing retard, or others. A driver tip-in may be detected from engine pedal position, vehicle speed, manifold vacuum and/or others. If so, the routine continues to step 528 to return engine operating conditions to a base mode.

Figure 6:
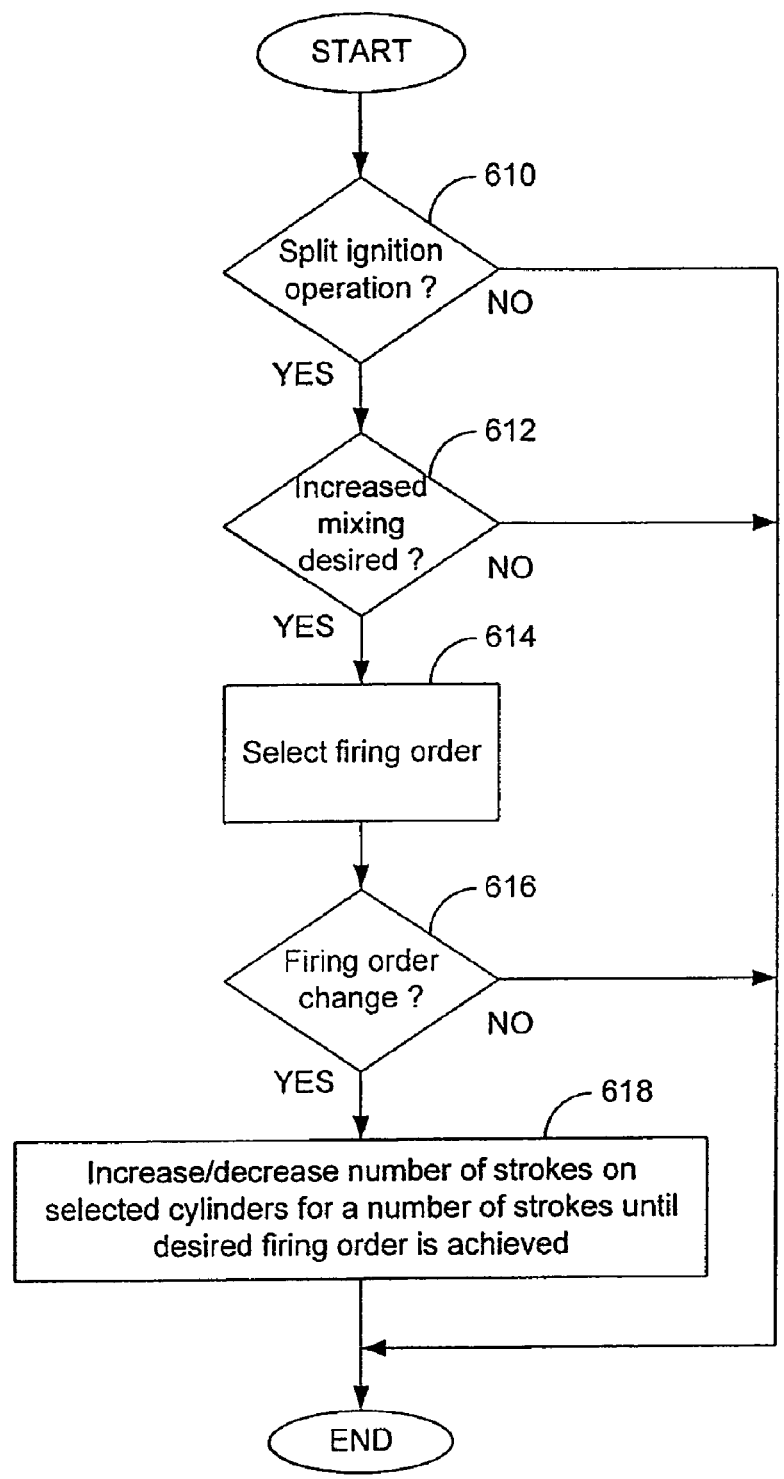

Referring now to FIG. 6, a routine is described for selecting various modes of operation for adjusting the various operating parameters as described above with regard to step 524. First, in step 610 the routine first determines whether one or more cylinders should be operated with different ignition timing retard. For example, such operation may be enabled only after a predetermined number of combustion events have occurred, or after a certain engine coolant temperature has been reached. In one embodiment, split ignition operation is enabled after reaching a pre-selected engine coolant temperature. In another embodiment, split ignition operation is enabled after at least one combustion event has occurred in each cylinder of the engine. In still another embodiment, split ignition operation is enabled after a first combustion event in any of the engine cylinders.

As described herein, one mode of operation that may be used is to operation a first group of cylinders with ignition timing retarded substantially more than another group of cylinders (which may have retarded or advanced ignition timing relative to top dead center (TDC). The difference in ignition timing may be more than 5 degrees, 8 degrees, 10 degrees, 20 degrees, 25 degrees, or more. Such operation can increase heat provided while still providing stable combustion and torque (or speed) control. Further, in one example, the cylinders with more retarded ignition timing produce significantly less torque, so that the remaining cylinders can operate at a higher load in order to make the overall engine torque meet the desired torque. Also, the cylinders with less ignition timing retard can provide most of the engine output torque and thereby control engine torque or idle speed, while the other cylinders with more retard generate even greater heat. Further still, since the engine is operating at a higher load, better airflow control can be achieved. In other words, since the change in throttle position (or valve timing) to change in airflow slope can be decreased at higher load, improved controllability may be achieved.

In one particular embodiment, the routine can set the ignition timing of a first and second cylinder groups to differing values. Specifically, the ignition timing for the first group can be set equal to a maximum torque, or best torque, timing (MBT), or to an amount of ignition retard that still provides good combustion for powering and controlling the engine. Further, the ignition timing for the second group can be set equal to a significantly retarded valued, for example −29 degrees or more. Note that various other values can be used in place of the 29 degrees value depending on engine configuration, engine operating conditions, and various other factors. Note that various other amounts of retard may be used, such as between 0-5 degrees after top dead center (TDC), 5-20 degrees after TDC, 5-35 degrees after TDC, or others.

Also, the amount of ignition timing retard for the second group can vary based on engine operating parameters, such as air-fuel ratio, engine load, and engine coolant temperature, or catalyst temperature (i.e., as catalyst temperature rises, less retard in the first and/or second group may be desired). Further, the combustion stability limit value can also be a function of these parameters. Also note that the first cylinder group ignition timing does not necessarily have to be set to maximum torque ignition timing. Rather, it can be set to a less retarded value than the second cylinder group, if such conditions provide acceptable engine torque control and acceptable vibration. That is, it can be set to the combustion stability spark limit (e.g., −10 degrees). In this way, the cylinders on the first group operate at a higher load than they otherwise would if all of the cylinders were producing equal engine output. In other words, to maintain a certain engine output (for example, engine speed, engine torque, etc.) with some cylinders producing more engine output than others, the cylinders operating at the higher engine output produce more engine output than they otherwise would if all cylinders were producing substantially equal engine output. As an example, if there is a four cylinder engine and all cylinders are producing a unitless output of 1, then the total engine output is 4. Alternatively, to maintain the same engine output of 4 with some cylinders operating at a higher engine output than others, then, for example, two cylinders would have an output of 1.5, while the other two cylinders would have an output of 0.5, again for a total engine output of 4. Thus, by operating some cylinders at a more retarded ignition timing than others, it is possible to place some of the cylinders into a higher engine load condition. This allows the cylinders operating at the higher load to tolerate additional ignition timing retard (or additional enleanment), if desired. Thus, in such examples, the cylinders operating with a unitless engine output of 1.5 could tolerate significantly more ignition timing retard than if all of the cylinders were operating at an engine output of 1. In this way, additional heat may be provided to the engine exhaust to heat the emission control device.

An advantage to the above aspect is that more heat can be created by operating some of the cylinders at a higher engine load with significantly more ignition timing retard than if operating all of the cylinders at substantially the same ignition timing retard, at least under some conditions. Further, by selecting the cylinder groups that operate at the higher load, and the lower load, it is possible to reduce engine vibration. Thus, in one embodiment, the engine starts by firing cylinders from both cylinder groups. Then, the ignition timing of the cylinder groups is adjusted differently to provide rapid heating, while at the same time providing good combustion and control.

Also note that the above operation can provide additional heat to both the first and second cylinder groups since the cylinder group operating at a higher load generates more heat flux to the catalyst, while the cylinder group operating with more retard operates at a high temperature. Also, when operating with a system of the configuration shown in FIG. 4 (for example a V-8 engine), the two banks are substantially equally heated since each catalyst is receiving gasses from both the first and second cylinder groups.

However, when using such an approach with a V-10 engine (where the banks constitute cylinder groups) the cylinder groups provide exhaust only to different banks of catalyst. As such, one bank may heat to a different temperature than the other. In this case, operation may be modified so periodically (for example, after a predetermined time period, or number of engine revolutions, etc.) the cylinder group operation is switched. In other words, if the routine starts with the first group operating with more retard than the second group, then after said duration, the second group is operated with more retard than the first, and so on. In this way, even heating of the exhaust system is achieved.

Also note that all of the cylinders in the first cylinder group do not necessarily operate at exactly the same ignition timing. Rather, there can be small variations (for example, several degrees) to account for cylinder to cylinder variability. This is also true for all of the cylinders in the second cylinder group (and the first group). Further, in general, there can be more than two cylinder groups, and the cylinder groups can have only one cylinder. However, in one specific example of a V8, configured as in FIG. 4, there are 2 groups, with four cylinders each. Further, the cylinder groups can be two or more.

Furthermore, the engine cylinder air-fuel ratios can be set at different levels. In one particular example, all the cylinders are operated substantially at stoichiometry. In another example, all the cylinders are operated slightly lean of stoichiometry. In still another example, the cylinders with more ignition timing retard are operated slightly lean of stoichiometry, and the cylinders with less ignition timing retard are operated slightly rich of stoichiometry. Further, in still another example, the overall mixture air-fuel ratio is set to be slightly lean of stoichiometry. In other words, the lean cylinders with the greater ignition timing retard are set lean enough such that there is more excess oxygen than excess rich gasses of the rich cylinder groups operating with less ignition timing retard.

In an alternative embodiment, two different catalyst heating modes may be provided. In the first mode, the engine operates with some cylinders having more ignition timing retard than others. As described above, this allows the cylinders to operate at substantially higher load (for example, up to 70% air charge), since the cylinders with more retard are producing less torque. Thus, the cylinders with less retard than others can actually tolerate more ignition timing retard than if all cylinders were operating with substantially the same ignition timing retard while providing stable combustion, at least under some conditions. Then, the remaining cylinders produce large amounts of heat, and the unstable combustion has minimal NVH (Noise, Vibration, Harshness) impacts since very little torque is being produced in those cylinders. In this first mode, the air-fuel ratio of the cylinders can be set slightly lean of stoichiometry, or other values as described above. In a second mode, the engine operates with all of the cylinders having substantially the same ignition timing, which is retarded to near the combustion stability limit. While this provides less heat, it may provide increased fuel economy.

Further, the engine cylinders are operated near stoichiometry, or slightly lean of stoichiometry. In this way, after engine start-up, maximum heat is provided to the catalyst by operating the engine in the first mode until, for example, a certain time elapses, or a certain temperature is reached. Then, the engine is transitioned to operating with all cylinders having substantially the same ignition timing retard. Then, once the catalyst has reached a higher temperature, or another prescribed time period has passed, the engine is transitioned to operating near optimal ignition timing.

In addition to the above variations, operating with one group of cylinders having ignition timing more, or significantly more, retarded than another group of cylinders can be combined with variations in valve timing, valve lift, numbers of active valves, valve patterns, and more to provide still other advantages. For example, the torque imbalance between the cylinder groups can be partially offset, or exaggerated (whichever is desired) by varying valve timing between the cylinder groups, such as with electrically actuated valves. In other words, the cylinders with less ignition timing retard can be operated with less (or more) fresh airflow by varying at least one of an intake valve opening location and/or an intake valve closing location than that of valves in the cylinders with more ignition timing retard. Further, the cylinder groups can be operated with differing amounts of residual gasses in the chamber by varying at least one of intake valve opening and/or exhaust valve closing (e.g., by varying overlap). For example, the first cylinder group may be operated with more (or less) valve overlap than another group of cylinders by varying timing of electrically actuated valves. Such operation can be used to optimize the valve timing for the different cylinder groups and tailor the valve timing to the specific combustion characteristics between the groups.

As another example, the number of active (or deactivated) valves or patterns of valves may be varied between the cylinder groups. In other words, the cylinder group with more retarded ignition timing may be operated with more (or less) active valves (or different valve patterns) to further vary the cylinder charge between cylinder group, and/or to vary cylinder motion between group. Such operation can improve combustion performance of the different groups to increase heat generation or improve burn characteristics and combustion stability.

As still another example, the number of cylinders in respective cylinder groups may be varied to vary heat generation and/or torque capacity. Also, the number of strokes in the cylinder groups may be varied to increase heat generation and/or torque capacity. For example, a group of cylinders with more retarded ignition timing than another group of cylinders can be operated with less strokes per combustion cycles (e.g., 2-stroke) to increase heat flux. Further, the valve timing of the cylinders operating with a different number of strokes can be varied to reduce the effects of operating with other than a four-stroke combustion cycle.

Returning to step 610, if disparate ignition timing operation is requested, the routine continues to step 612 where it is determine whether increased exhaust mixing between the cylinder groups is desired. If so, the routine continues to step 614 to select a firing order. If a firing order change is requested (e.g., the selected firing order is different from the current firing order), the routine continues to step 616 to change the firing order. Then, the routine continues to step 618 to increase and/or decrease a number of strokes on selected cylinders for a number of strokes, or combustion cycles, until the desired firing order is obtained. Note that more than one cylinder may be selected to vary its number of strokes, and in such a case the cylinders can have their strokes increased concurrently or serially, or combinations thereof. Further, under variable conditions, different cylinders may be selected to increase and/or decrease the number of strokes to vary the combustion sequence.

Thus, in one example, all of the engine cylinders may be operating in a four-stroke combustion cycle. Then, one or more cylinders can be operated with an increase or decreased number of strokes (e.g., 2-stroke, 6-stroke) for one or more cycles until the new desired firing order is achieved. At that point, the cylinders with increased/decreased strokes can be returned to four-stroke operation.

Another example where variation in exhaust mixing may be used relates to a V-8 engine, where the firing may not be bank-to-bank. For example, a V-8 engine may have a firing order of 1-5-4-2-6-3-7-8 (where cylinder 1 corresponds to cylinder 410 of FIG. 4, cylinder 2 corresponds to cylinder 412, and so on up to cylinder 8 corresponding to cylinder 418). Further, the bank sequence firing is R-L-R-R-L-R-L-L (where R corresponds to a right bank and L corresponds to a left bank). In split ignition operation, four cylinders produce a majority of the engine torque (denoted as "P" cylinders) and the other four produce very little torque but large amounts of heat (denoted as "H" cylinders).

In one embodiment, for smoother engine operation, the firing of the cylinders should alternate, such as the firing is P-H-P-H-P-H-P-H. In other words, below a selected speed, for example, the engine is operated with the above firing order to reduce NVH issues, while still providing the desired engine torque and exhaust heat.

However, under other operating conditions (e.g., above a selected engine speed), for improved exhaust mixing, the firing order may be varied, where two cylinders (e.g., both cylinders 3 and 5, which are H cylinders and therefore produce very little torque), are operated in a different firing sequence, where the cylinders can be switched at the onset of the split ignition mode, for example, and switched back after the catalyst has reached a set temperature, since they are producing reduced engine torque. Thus, in one mode, the two banks will fire as follows:

Right Bank—P-x-P-H-x-H-x-x

Left Bank—x-H-x-x-P-x-P-H

Then, in another mode, cylinders 3 and 5, for example, will be switched so that the engine will fire as follows (e.g., a firing order of 1-3-4-2-6-5-7-8):

Right Bank—P-H-P-H-x-x-x-x

Left Bank—x-x-x-x-P-H-P-H

In this way, improved mixing on each bank can be achieved, in that there will be better mixing of the exhaust from the P and H strokes which can result in faster heating of the catalyst with improved post flame oxidation of hydrocarbons (HC). Further, as noted above, the cylinder firing order may be switched by increasing/decreasing a number of strokes in one or more cylinders.

In another embodiment, the engine can be started with a first firing order and then switched to a different firing order once a predetermined exhaust and/or catalyst temperature has been reached, for example. In other words, during a cold start, the engine can start in split ignition operation with cylinders 3 and 5, for example, already in an alternate firing order for improved mixing. Then, each of cylinders 3 and 5 can be operated for a single cycle (or more) with an increased number of strokes (e.g., six-stroke, with double compression, double exhaust, double intake, etc.) to switch prior to ending split ignition operation.

In still another embodiment, improved starting time may be achieved by starting with all cylinders firing with substantially similar ignition timing, and then switching two cylinders using a six-stroke mode (e.g., with multiple exhaust strokes, having valves opened or closed).

Note that when increasing a number of strokes to changing firing order, there may be a small torque deficiency due to the temporary six-stroke operation. However, since in one embodiment the two cylinders being adjusted are producing reduced torque, there such a decrease may be neglected. The torque deficiency may also be compensated by temporarily increasing torque of other cylinders currently firing when multi-stroking the cylinders to mask any torque disturbance. Further, the torque hole can be decreased by trapping most of the exhaust for the 4th, 5th and 6th strokes.

Figure 7:
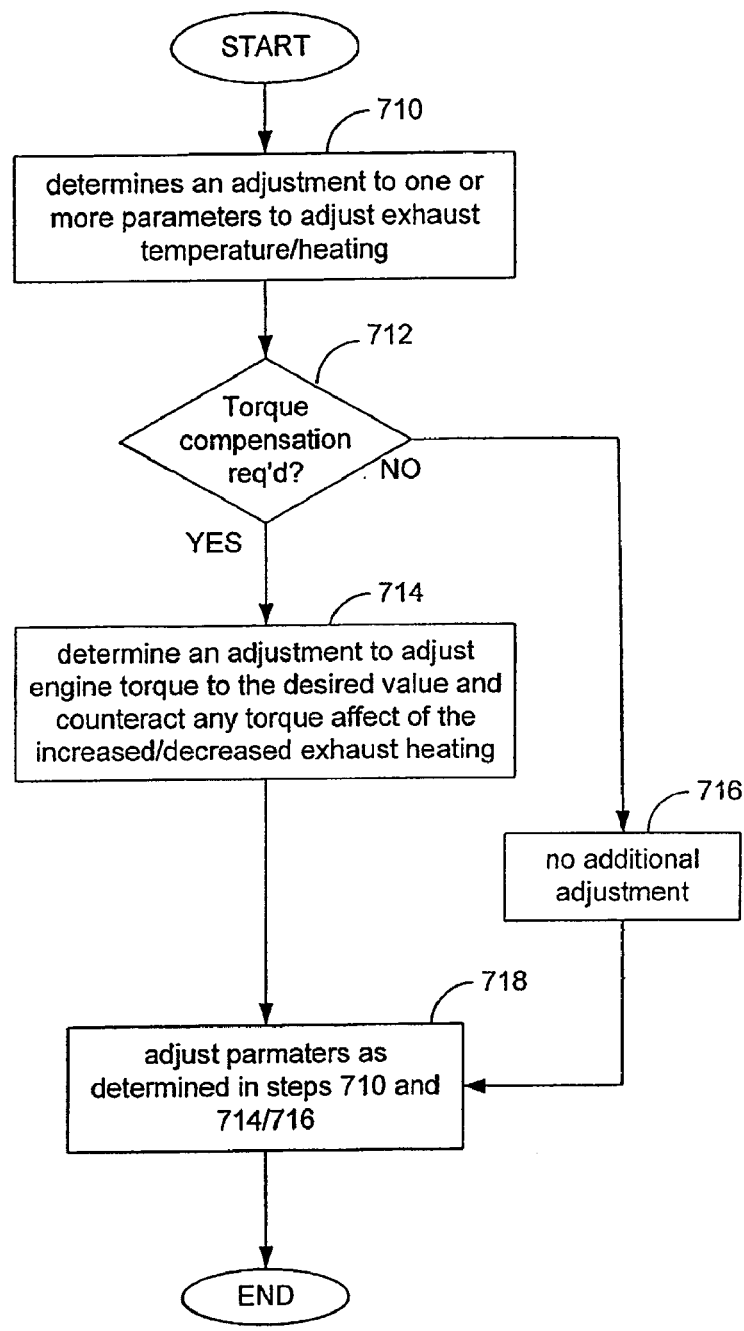

Referring now to FIG. 7 and continuing with a description of additional aspects of the control routines described herein, there are various control actions for increasing/decreasing exhaust/catalyst temperature and increasing/decreasing engine torque, such as selected in step 524. As noted above, various methods may be selected and/or combined under various operating conditions to achieve advantageous operation. For example, one or more of the following adjustments may be used alone or in combination to adjust exhaust temperature:

adjusting ignition timing of cylinders with ignition timing retard significantly more than other cylinders;

varying a number of cylinders with retarded ignition timing;

varying air amounts between cylinder groups (e.g., between groups with more or less ignition timing retard);

varying spark timing of cylinders with significant retard;

varying a number of cylinders operating in 2-stroke mode;

varying a number of exhaust valves active in a cylinder;

varying exhaust valve and/or intake valve timing of cylinders and/or between cylinder groups;

varying a pattern of valves between cylinder groups;

varying firing order;

varying engine throttle;

varying engine idle speed; and others.

As described herein, the above approaches may be used in combination to achieve certain advantageous operation. Further, since some of these actions may affect engine torque, various other adjustments may be used to balance engine torque output during such adjustments. These may include:

adjusting spark timing cylinders with less spark retard adjusting a number of cylinders with more/less spark retard adjusting air and/or fuel amounts to cylinders with less spark retard;

adjusting a number of intake valves active on cylinders with less spark retard;

adjusting exhaust valve and/or intake valve timing of cylinders and/or between cylinder groups;

adjusting valve lift of cylinders with less spark retard;

adjusting engine throttle; and others.

However, in one example where split ignition timing is used, adjustments made to cylinders with greater spark retard can have a minimal impact on engine torque, and thus only small adjustments may be needed to maintain overall engine torque.

Continuing with FIG. 7, in step 710 the routine determines an adjustment to one or more of the above parameters to adjust exhaust temperature. Then, in step 712, the routine determines if any adjustment is necessary to compensate for a torque change caused by the adjustment determined in step 710. If so, the routine continues to step 714 to determine an adjustment to adjust engine torque to the desired value and counteract any torque affect of the increased/decreased exhaust heating. Then, the routine continues to step 718 to adjust parameters as determined in steps 710 and 714/716.

Referring now to FIGS. 8-11, several engine timing diagrams illustrate various alternative embodiments of the operation described herein, shows intake valve timing (I), exhaust valve timing (E), fuel injection (inj) and ignition/spark timing (spk). The x-axis illustrated engine/piston position assuming a four-stroke combustion cycle (which may not be the actual case, such as described below), with 0 degrees indicating TDC of a compression for such an assumed cycle.

Figure 8:
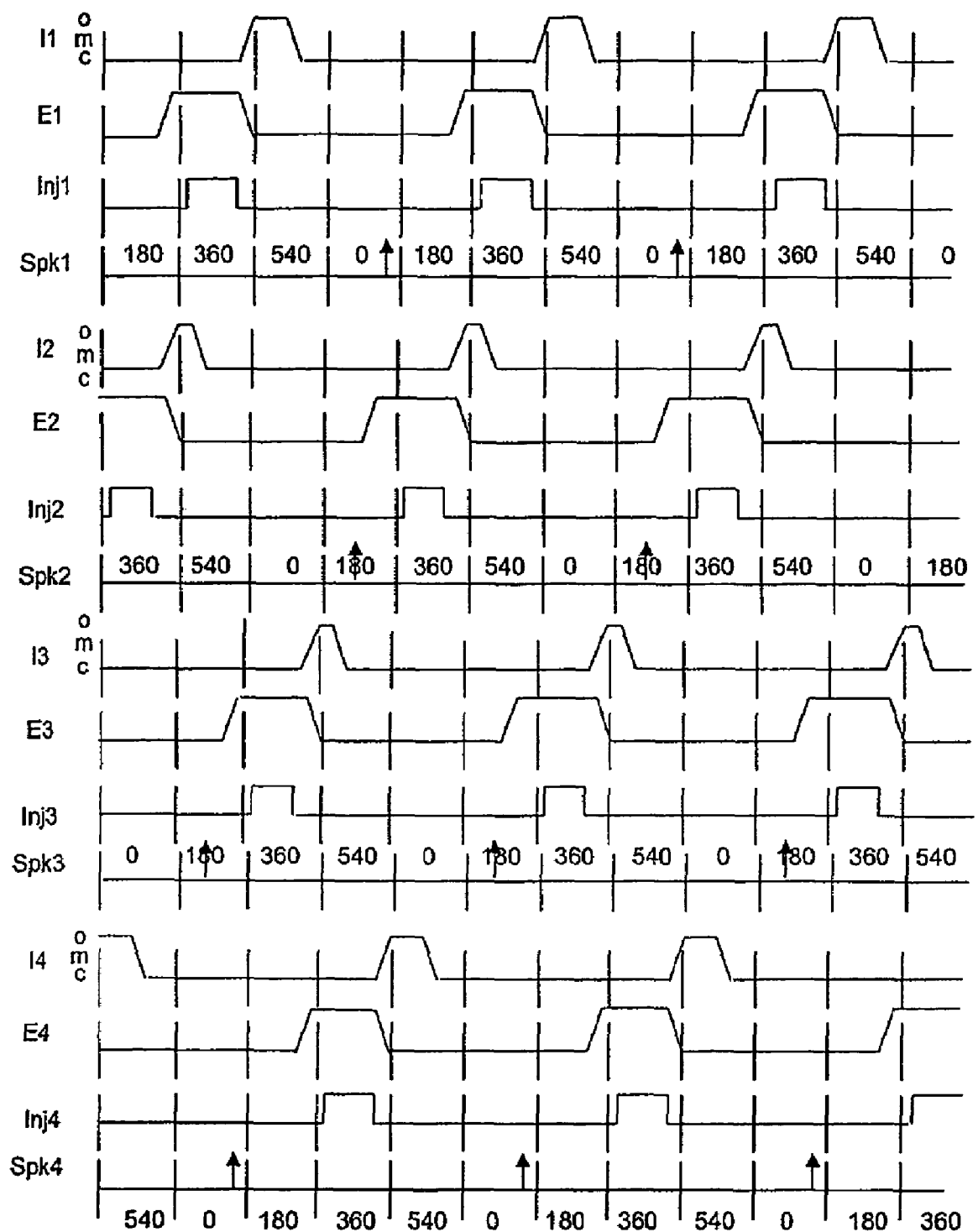
FIGS. 8-11 are engine timing diagrams illustrating various example embodiments.

FIG. 8 shows an I-4 example where cylinders 1 and 4 form a first group and cylinders 2 and 3 form a second group, such as shown in FIG. 3, for example. Alternatively, FIG. 8 may show one bank of a V-8 engine. FIG. 8 shows a port fuel injected example where different valve timings are used between the cylinder groups operating with split ignition timing, and where each cylinder has one intake valve and one exhaust valve. Further, the fuel injection is varied between the cylinders so that both cylinders operate with an air-fuel ratio about stoichiometry. Specifically, cylinders 1 and 4 operate with less ignition timing retard than cylinders 2 and 3. Further, cylinders 1 and 4 operate with increased cylinder air charge (due to longer intake valve opening), with correspondingly more injected fuel.

Figure 9:
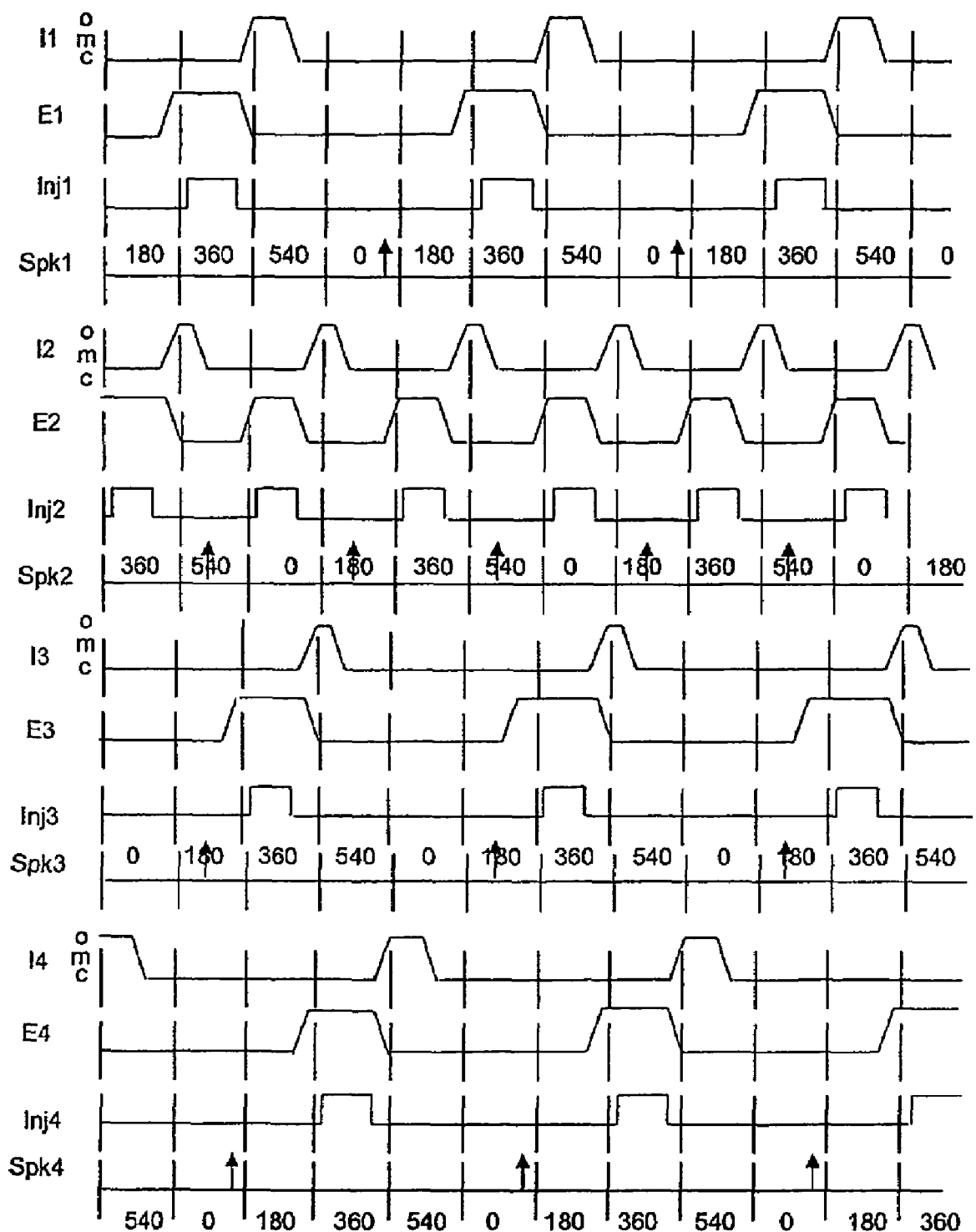

FIG. 9 shows an example similar to that of FIG. 8, except that multi-stroke operation is shown where cylinder 2 operates in a 2-stroke mode to increase heat flux. Again, different valve timings are utilized between cylinder groups, where the valve timing of cylinder 2 may be adjusted so that improved 2-stroke operation is achieved.

Figure 10:
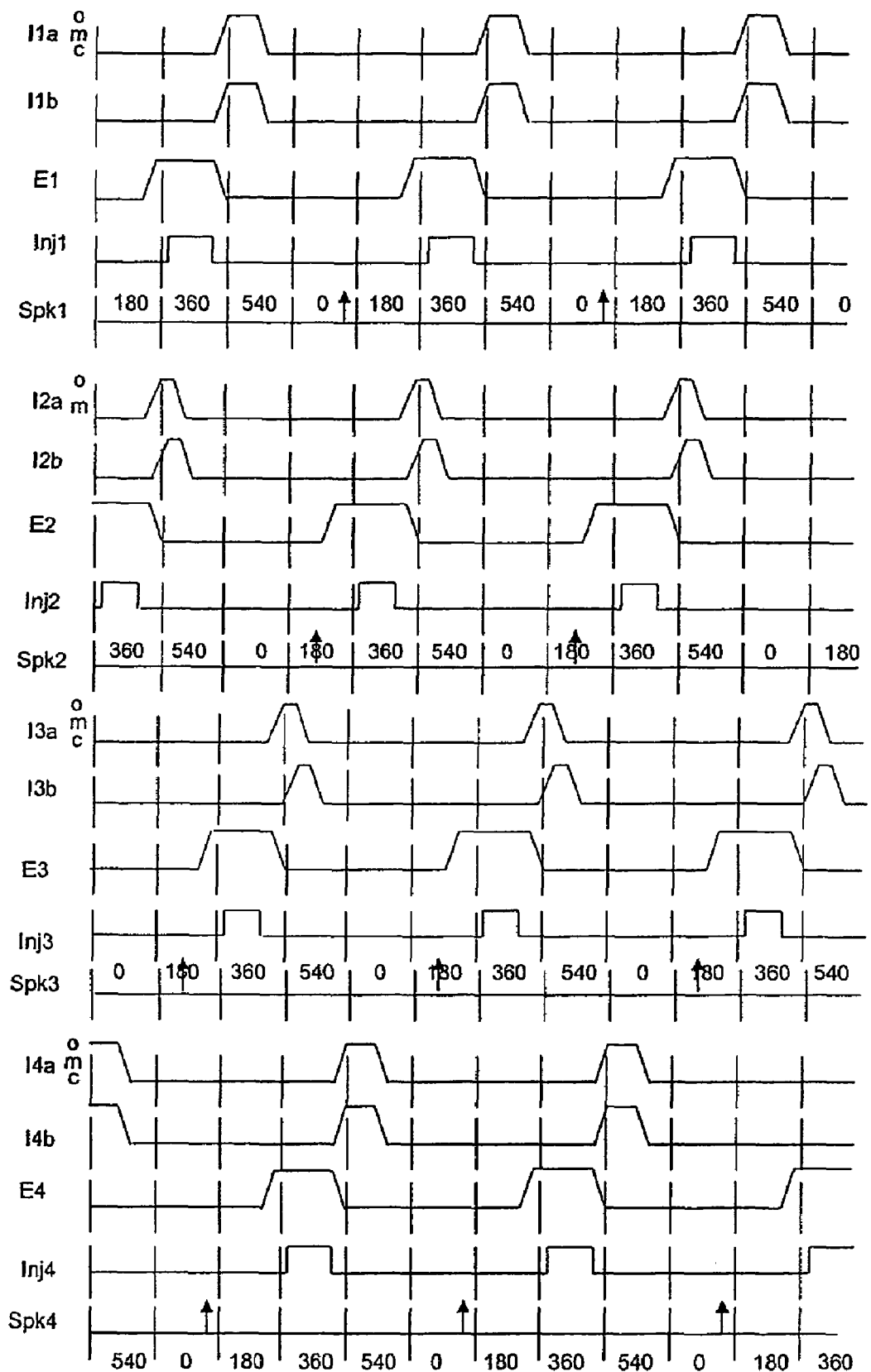

FIG. 10 shows an example similar to that of FIG. 8, except that each cylinder has two intake valve and one exhaust valve. FIG. 9 also shows variation in valve timing between the cylinder groups, and also shows how valve timing between two intake valves in a given cylinder may be varied (e.g., to increase charge motion). It also illustrates how some cylinder groups may use staggered cylinder valve timing while other cylinder groups operate two intake valves with equal timing). In this way, charge motion suited to the different combustion in the cylinder groups may be achieved.

Figure 11:
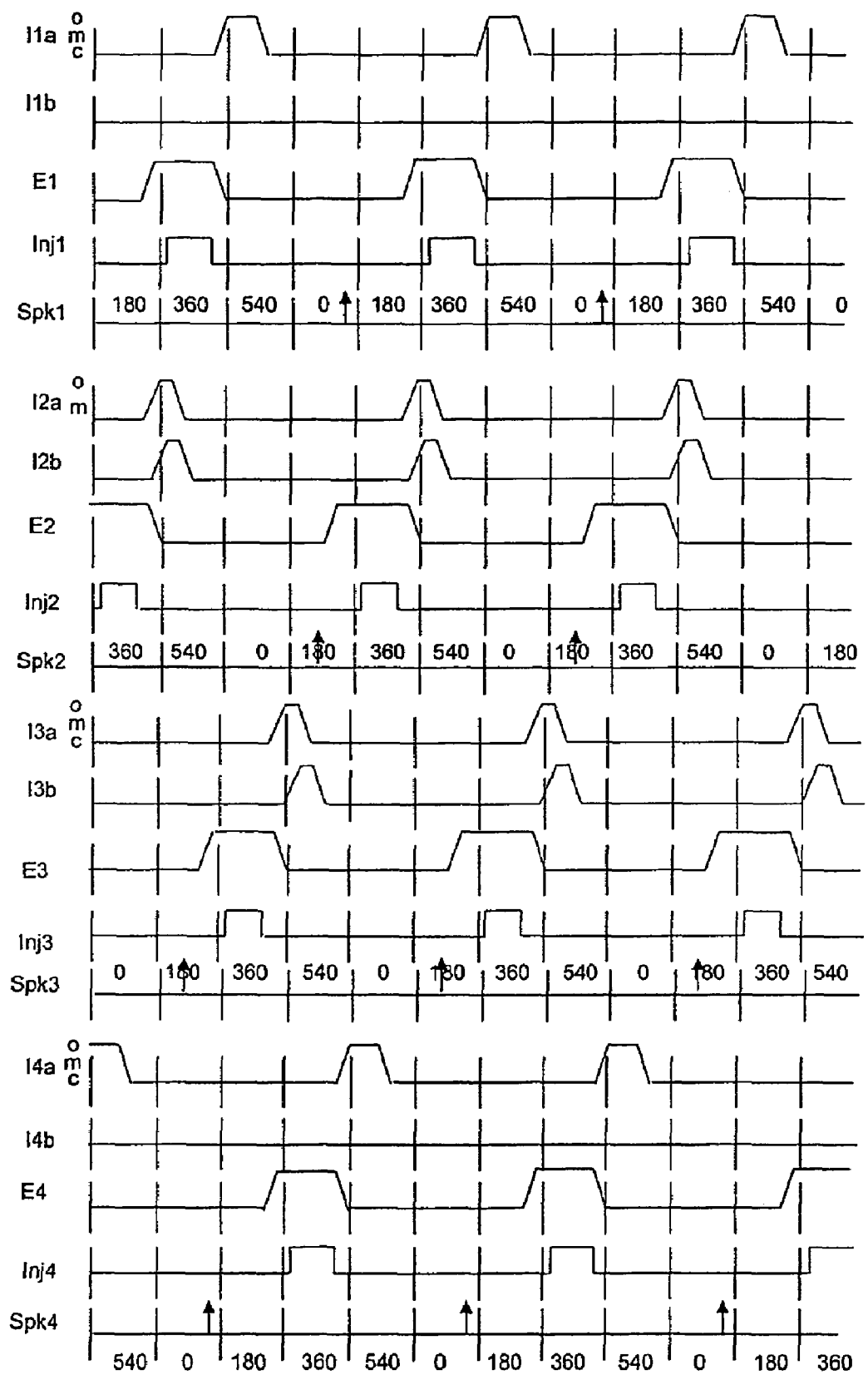

FIG. 11 shows another example similar to that of FIG. 8, except that each cylinder has two intake valve and one exhaust valve. FIG. 11 also shows variation in valve timing between the cylinder groups, as well as how a different number of valves between cylinder groups may be used to advantage.

While the above figures show several variations, numerous others are possible.

It will be appreciated that the configurations and routines disclosed herein are exemplary in nature, and that these specific embodiments are not to be considered in a limiting sense, because numerous variations are possible. For example, the above approaches can be applied to V-6, I-4, I-6, V-12, opposed 4, and other engine types. Also, the approaches described above are not specifically limited to a dual coil valve actuator. Rather, it could be applied to other forms of actuators, including ones that have only a single coil per valve actuator, and/or other variable valve timing systems, such as, for example, cam phasing, cam profile switching, variable rocker ratio, etc.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method for operating an engine having at least a first and second cylinder, comprising:
    operating the first cylinder with a spark timing more retarded than a spark timing of a second cylinder; and
    operating one of said first cylinder and second cylinder with a first number of strokes per cycle different from other cylinders of the engine for at least one combustion cycle, wherein said first cylinder is operated with a first number of strokes per cycle, and said second cylinder is operated with a second number of strokes per cycle greater than said first number.

2. The method of claim 1 wherein said first cylinder includes 2-stroke operation and said second cylinder includes 4-stroke operation.

3. The method of claim 1 wherein said operation with said different number of strokes is performed temporarily to transition the engine from a first firing order to a second firing order different from said first firing order.

4. The method of claim 3 wherein more than one cylinder is operated with said first number of strokes.

5. A method for operating an engine having at least a first and second cylinder, comprising:
    operating the first cylinder with a spark timing more retarded than a spark timing of a second cylinder; and
    operating one of said first cylinder and second cylinder with a first number of strokes per cycle different from other cylinders of the engine for at least one combustion cycle, wherein said operation with more retarded spark timing is performed before said operation with different a different number of strokes.

6. A method for operating an engine having at least a first and second cylinder, comprising:
    operating the first cylinder with a spark timing more retarded than a spark timing of a second cylinder; and
    operating one of said first cylinder and second cylinder with a first number of strokes per cycle different from other cylinders of the engine for at least one combustion cycle, wherein said operation with more retarded spark timing is performed after said operation with different a different number of strokes.

7. A method for operating an engine having at least a first and second cylinder, comprising:
    operating the first cylinder with a spark timing more retarded than a spark timing of a second cylinder, where during said operation, said first cylinder operates with a first number of strokes per cycles and said second cylinder operates with a second number of strokes per cycle, where said first number is different from said second number, wherein the first cylinder operates with a spark timing substantially more retarded than a spark timing of a second cylinder, and wherein a difference between said spark timing of the first and second cylinders is more than 8 degrees.

8. The method of claim 7 wherein said first number of strokes is two, and said second number of strokes is four.

9. The method of claim 8 wherein said operation is carried out when adjusting a firing order of the engine during engine operation.

10. The method of claim 8 wherein said operation is performed during at least some engine cold starting conditions after at least one combustion event in each cylinder of the engine.

11. The method of claim 10 wherein said first cylinder operates with valve timing different from said second cylinder.

12. The method of claim 11 wherein more than one cylinder operates with a two-stroke combustion cycle.

13. The method of claim 11 wherein more than one cylinder operates with a two-stroke combustion cycle serially when changing firing order.

14. The method of claim 11 wherein more than one cylinder operates with a two-stroke combustion cycle simultaneously when changing firing order.

15. A method for operating an engine having at least a first and second cylinder, comprising:

operating the first cylinder with a spark timing more retarded than a spark timing of a second cylinder, where during said operation, said first cylinder operates temporarily with a first number of strokes per cycle and said second cylinder operates with a second number of strokes per cycle, where said first number is different from said second number to change a firing order of the engine, and then said first cylinder operates with said second number of strokes, wherein under different operating conditions, a third cylinder operating with a spark timing more retarded than said timing of said second cylinder is operated with a number of strokes per cycle different from said second number of strokes to change a firing order of the engine.

16. The method of claim 15 wherein a difference between said spark timing of the first and second cylinders is more than 8 degrees.

17. The method of claim 15 wherein said first number of strokes is two, and said second number of strokes is four.

18. The method of claim 15 wherein said operation is performed during at least some engine cold starting conditions after at least one combustion event in each cylinder of the engine.

\* \* \* \* \*